United States Patent
Sung et al.

(10) Patent No.: US 10,778,689 B2
(45) Date of Patent: Sep. 15, 2020

(54) SUSPICIOUS ACTIVITY DETECTION IN COMPUTER NETWORKS

(71) Applicant: International Business Machines Corporation, Armonk, NY (US)

(72) Inventors: Chul Sung, White Plains, NY (US); Nicholas Sauriol, Ottawa (CA); Brian K. Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 16/123,521

(22) Filed: Sep. 6, 2018

(65) Prior Publication Data
US 2020/0084219 A1 Mar. 12, 2020

(51) Int. Cl.
*H04L 29/06* (2006.01)

(52) U.S. Cl.
CPC ........ *H04L 63/102* (2013.01); *H04L 63/1425* (2013.01)

(58) Field of Classification Search
CPC .......................... H04L 63/102; H04L 63/1425
See application file for complete search history.

(56) References Cited

U.S. PATENT DOCUMENTS

| | | |
|---|---|---|
| 5,819,226 A | 10/1998 | Gopinathan et al. |
| 6,029,154 A | 2/2000 | Pettitt |
| 8,280,833 B2 | 10/2012 | Miltonberger |
| 8,588,744 B2 | 11/2013 | Vendrow et al. |
| 9,424,612 B1 * | 8/2016 | Bright .................. G06Q 50/01 |
| 9,736,178 B1 | 8/2017 | Ashley |
| 9,740,858 B1 | 8/2017 | Wu et al. |
| 2005/0257261 A1 * | 11/2005 | Shraim .................. H04L 51/12 726/22 |

(Continued)

FOREIGN PATENT DOCUMENTS

| | | |
|---|---|---|
| CN | 102209075 A | 10/2011 |
| CN | 105072137 A | 11/2015 |

OTHER PUBLICATIONS

Stack Overflow, "Best way to detect similar email addresses?", https://stackoverflow.com/questions/2812280/best-way-to-detect-similar-email-addresses, May 2010, Accessed on Sep. 5, 2018, 7 pages.

(Continued)

*Primary Examiner* — Michael R Vaughan
(74) *Attorney, Agent, or Firm* — Scully, Scott, Murphy & Presser, P.C.; Michael O'Keefe

(57) ABSTRACT

Methods and systems of classifying suspicious users are described. A processor may determine whether a domain name, of an email address of a user that requested to access a network, is valid. The processor may classify the user as a suspicious user if the domain name is invalid. If the domain name is valid, the processor may determine a likelihood that the email address is a script-generated email address. The processor may classify the user as a suspicious user if the email address is likely to be a script-generated email address. If the email address is unlikely to be a script-generated email address, the processor may identify abnormal usage behavior exhibited by the user based on a reference model. The processor may classify the user as a suspicious user if abnormal usage behavior is identified, and may reject a subsequent request from the user to access the network.

20 Claims, 6 Drawing Sheets

(56) References Cited

U.S. PATENT DOCUMENTS

| | | | |
|---|---|---|---|
| 2009/0182818 A1* | 7/2009 | Krywaniuk | H04L 63/1416 |
| | | | 709/206 |
| 2014/0358939 A1* | 12/2014 | Simon | G06F 16/24578 |
| | | | 707/748 |
| 2015/0007312 A1 | 1/2015 | Pidathala et al. | |
| 2015/0358343 A1* | 12/2015 | Segal | H04L 63/1425 |
| | | | 726/23 |
| 2017/0078321 A1 | 3/2017 | Maylor et al. | |
| 2017/0085584 A1 | 3/2017 | Goutal et al. | |
| 2019/0132352 A1* | 5/2019 | Zhang | H04L 63/1441 |
| 2019/0260804 A1* | 8/2019 | Beck | H04L 63/0209 |

OTHER PUBLICATIONS

Bi, M., et al., "Anomaly detection model of user behavior based on principal component analysis", J Ambient Intel Human Comput, Received Jun. 1, 2015, Accepted Dec. 24, 2015, Published online Jan. 21, 2016, pp. 547-554.

International Search Report dated Nov. 27, 2019 in a corresponding foreign application, namely International Application No. PCT/IB2019/057035, 9 pages.

* cited by examiner

SUSPICIOUS ACTIVITY DETECTION IN COMPUTER NETWORKS

FIELD

The present application relates generally to computers, and computer applications, and more particularly to computer-implemented methods and systems relating to cyber-security and computer networks.

BACKGROUND

A network, such as a cloud computing platform, may provide products or services to a plurality of users. In some example usage circumstances, such as a free-trial period, or applications using a freemium model, the network may provide the products or services without requiring the users to provide specific user information such as payment information, credit information, or other user specific information. If an attack occurs on the network during such usage circumstances, it may be difficult for a security system to trace the attack to a particular user, or a source of the attack, since there may not be sufficient user specific information associated with users of the network.

SUMMARY

In some examples, a method of classifying suspicious users of a network is generally described. The method, in one aspect, includes receiving, by a processor, a user profile of a user who requested to access a network. The user profile comprises at least an email address, where the email address comprises a domain name. The method further includes determining, by the processor, whether the domain name is valid. The method further includes in response to determining that the domain name is invalid, classifying, by the processor, the user as a suspicious user. The method further includes in response to determining that the domain name is valid, determining, by the processor, a likelihood that the email address is a script-generated email address. The determination of the likelihood is based on a difference between the email address and a plurality of email addresses, where the plurality of email addresses comprises the domain name, and the plurality of email addresses are associated with other users who have requested access to the network. The method further includes in response to determining, based on the likelihood, that the email address is a script-generated email address, classifying, by the processor, the user as a suspicious user. The method further includes in response to determining, based on the likelihood, that the email address is not a script-generated email address, comparing, by the processor, usage behavior of the user with a reference model, where the usage behavior indicates historical usage of the network by the user. The method further includes determining, by the processor, whether there is a presence of abnormal usage behavior exhibited by the user on the network based on the comparison. The method further includes in response to determining the presence of abnormal usage behavior exhibited by the user on the network, classifying, by the processor, the user as a suspicious user. The method further includes rejecting, by the processor, a subsequent request from the user to access the network.

In some examples, a system including a memory device and a hardware processor to classify suspicious users of a network is generally described. The memory device is configured to store a user setting of a user who requested to access a network. The user setting comprises at least an email address and usage behavior of the user, where the email address comprises a domain name, and the usage behavior indicates historical usage of the network by the user. The hardware processor is configured to be in communication with the memory device. The hardware processor is configured to determine whether the domain name is valid. The hardware processor is further configured to, in response to a determination that the domain name is invalid, classify the user as a suspicious user. The hardware processor is further configured to in response to a determination that the domain name is valid, determine a likelihood that the email address is a script-generated email address. The determination of the likelihood is based on a difference between the email address and a plurality of email addresses, the plurality of email addresses comprises the domain name, and the plurality of email addresses are associated with other users who have requested access to the network. The hardware processor is further configured to, in response to a determination, based on the likelihood, that the email address is a script-generated email address, classify the user as a suspicious user. The hardware processor is further configured to, in response to a determination, based on the likelihood, that the email address is not a script-generated email address, compare the usage behavior with a reference model. The hardware processor is further configured to determine whether there is a presence of abnormal usage behavior exhibited by the user on the network based on the comparison. The hardware processor is further configured to, in response to the determination of the presence of abnormal usage behavior exhibited by the user on the network, classify the user as a suspicious user. The hardware processor is further configured to reject a subsequent request from the user to access the network.

In some examples, a computer program product of classifying suspicious users of a network is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

A system in accordance with the present disclosure (e.g., a system 100 shown in FIG. 1) in some embodiments provides an application to address challenges in securing information and resources among a network. The system 100 is implemented to detect a source of suspicious activities, such as a user of the network, particular computer processes, threads, devices, based on user profiles of the users of the network, where the user profiles may include at least an identifier, such as an email address. The system 100 analyzes the identifiers and/or email addresses of the users in order to identify any suspicious activities being performed on the network. In an example embodiment, the system 100 analyzes the email addresses of users in order to identify email addresses that may be script-generated email addresses, such as email accounts that have been generated automatically by a computer program. Further, the system 100 classifies users as suspicious users based on the analysis performed on the email addresses such that an administrator of the network may review user accounts of the classified suspicious users.

The system 100 may improve a system that performs binary detection, such as determining whether to trust or not trust a user, by classifying suspicious users and activities prior to confirming whether to trust a user. Further, in some examples, using user specific information such as credit card, phone numbers or other external validations to detect suspicious activities on the network may be insufficient, and may be cumbersome due to multiple entities that may be involved, such as phone providers, credit card companies, credit score agencies, banks, the users themselves, and/or other entities. For example, it may be difficult to validate a phone number since the procedures to obtain phone records and identities of the owners of phone numbers require permissions from multiple entities and may involve genuine information of the owners.

Figure 1:
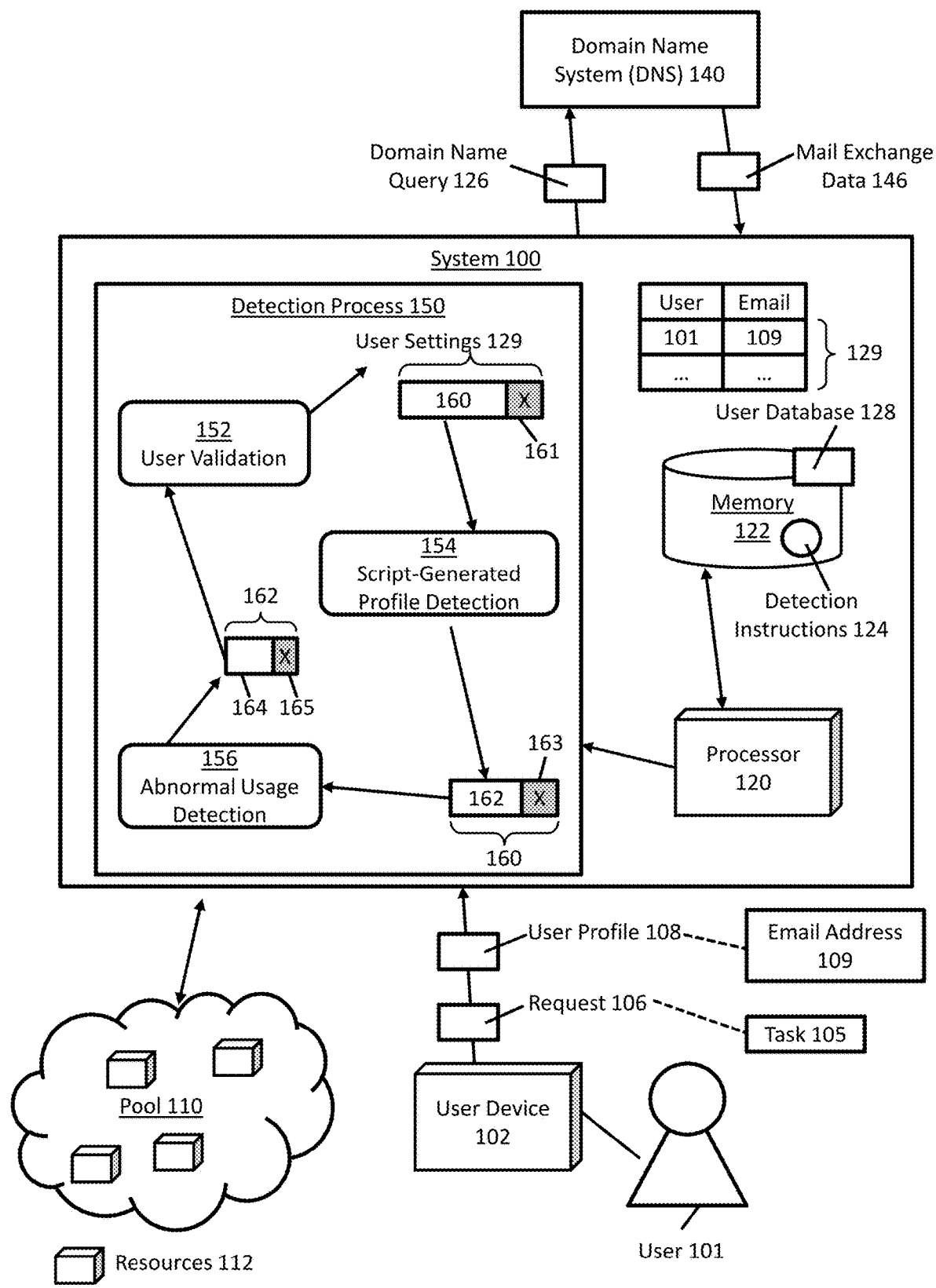
FIG. 1 illustrates an example computer system in one embodiment that can be utilized to implement suspicious activity detection in computer networks in one embodiment.

FIG. 1 illustrates an example computer system 100 that can be utilized to implement suspicious activity detection in computer networks, arranged in accordance with at least some embodiments described herein. In some examples, the system 100 is a system implemented on a computer device. In some examples, the system 100 may be a security system that is a part of a network. The system 100 may include a processor 120 and a memory 122 configured to be in communication with each other. In some examples, the processor 120 may be a central processing unit of a computer device, and may be configured to control operations of the memory 122 and/or other components of the system 100. In some examples, the system 100 may include additional hardware components, such as programmable logic devices, microcontrollers, memory devices, and/or other hardware components, that may be configured to perform respective tasks of the methods described in the present disclosure. In some examples, the processor 120 may be configured to execute software modules that include instructions to perform each respective task of the methods described in the present disclosure.

The memory 122 is configured to selectively store instructions executable by the processor 120. For example, in one embodiment, the memory 122 may store a set of detection instructions 124 ("instructions 124"), where the instructions 124 include instructions, such as executable code, related to string operations and machine learning algorithms, and/or other algorithms or techniques, which may implement the system 100. The processor 120 is configured to execute one or more portions of the instructions 124 in order to facilitate implementation of the system 100. In some examples, the instructions 124 may be packaged as a standalone application that may be installed on the computer device implementing the system 100, such that the instructions 124 may be executed by the processor 120 to implement the system 100. In some examples, the instructions 124 may be stored in a programmable hardware component that may be embedded as part of the processor 120.

In some examples, the processor 120 and/or the memory 122 may be configured to be in communication with a pool 110, where the pool 110 is a network of resources 112. The resources 112 may include hardware components and software components, such as processors, memory, routers, switches, networks, data centers, software programs, and/or other resources. In some examples, the pool 110 may be a cloud computing environment, such as a private cloud, a community cloud, a public cloud, or a hybrid cloud. In some examples, the system 100 may be a system configured to process service requests to employ resources 112 among the pool 110, such as processing service orders of resources 112 among the pool 110, where the ordered resources may be employed by a user to perform a computing task. For example, a user 101 may use a user device 102 to send a request 106 to the system 100, where the request 106 may be a request to employ one or more resources 112 from the pool 110 to perform a task 105. Some examples of the task 105 may include computer related task such as dataset processing, data storage, application deployment, content hosting, application execution, and/or other computing task.

The memory 122 may be further configured to store a user database 128. The user database 128 is a database storing user settings 129 of a plurality of users of the pool 110. Each user setting 129 corresponds to a user profile of a user, and may include first name, last name, username, password, phone number, mailing address, usage behavior data (e.g., time, frequency, and/or pattern of corresponding user accessing the resources 112), and/or other information associated with the user. The user settings 129 may include information provided by the users, and may also include information generated by the processor 120. In an example shown in FIG. 1, the processor 120 may receive the request 106 and, in response, may request the user device 102 to provide a user profile 108. The user profile 108 may include at least an email address 109 of the user 101, and/or other information associated with the user 101, such as first name, last name, username, phone number, mailing address, and/or other information. In some examples, the processor 120 may determine whether there is a presence of an email address in the user profile 108. In response to an absence of an email address in the user profile 108, the processor 120 may request the user 101 to provide an email address. In response to a presence of an email address in the user profile 108, the processor 120 may store the user profile 108 as part of the user setting 129 corresponding to the user 101. The processor 120 may further generate usage behavior data, such as by tracking usage behavior exhibit by the user 101 on the pool 110, and add the generated usage behavior data to the user setting 129 corresponding to the user 101. The processor 120 may continue to update the user settings 129 based on continuous tracking of usage behavior exhibit by the users of the pool 110.

The processor 120 may execute a detection process 150 to detect one or more sources of suspicious activities. For example, the processor 120 may execute the detection process 150 to classify one or more users as potential suspicious users. In another example, the processor may execute the detection process 150 to classify particular computer processes, threads, devices, Internet Protocol (IP) addresses, and/or other sources, as sources of suspicious activities. The detection process 150 includes one or more operations that may be performed by the processor 120, such as user validation 152, script-generated profile detection 154, and abnormal usage detection 156.

The detection process 150 may be performed on the user settings 129 stored in the user database 128. In some examples, the processor 120 may automatically perform the detection process 150 periodically at time intervals defined in instructions 124. In some examples, the processor 120 may automatically perform the detection process 150 in response to receiving a new user profile. The time and situation to perform the detection process 150 is based on a desired implementation of the system 100. For example, the system 100 may be configured to automatically perform the detection process 150 periodically in order to reduce processing power. In another example, the system 100 may be configured to automatically perform the detection process 150 based on different security levels defined by the instructions 124, such as performing the detection process 150 in response to receiving each new user profile, or in response to receiving every five pieces of new user profiles.

The user validation 152 includes analyzing one or more user settings 129, stored in the user database 128 in order to identify source of suspicious activities. In some examples, analysis of the user settings 129 includes validating phone numbers by automatically dialing the phone numbers, checking if a domain name of each email address among the user settings 129 is existing, whether a country of each mailing address of the user settings 129 matches the domain name of a corresponding email address, and/or other types of validation. For example, the processor 120 may determine whether geographical parameters are consistent within each user settings 129, such as determining whether an area code of a phone number, an email domain, and a country of a mailing address includes a same country.

In another example, the user validation 152 also includes validating whether the domain name of each email address exists by sending a domain name query 126 to domain name system (DNS) 140. The domain name query 126 is a query on the domain names of each email address among the user settings 129 stored in user database 128. The DNS 140 may return mail exchange (MX) data 146 including mail exchange records that indicate mappings of a plurality of domain names among the domain name query 126 to one or more mail exchange servers. For example, the domain name query 126 includes domain names of email addresses of user settings 129, but the mail exchange data 146 may include mappings of domain names of a subset of user settings 160 to respective lists of mail exchange servers. The processor 120 may determine that the domain names of the subset of user settings 160 exist, and may determine that domain names of the remaining subset of user settings 161 are nonexistent by identifying domain names that are excluded from the mail exchange data 146. The processor 120 classifies the users corresponding to user settings 161 as suspicious and may restrict, or block, access to the resources 112 from the suspicious users corresponding to the user settings 161. For example, the processor 120 may not fulfill a subsequent request, or any future requests, to use the resources 112 to execute an application requested by a suspicious user. Upon completing the user validation 152, the processor 120 proceeds to perform the script-generated profile detection 154 on the user settings 160.

The script-generated profile detection 154 includes determining whether each user setting 160 includes identifiers, such as name, phone number, email addresses generated by a script or computer program. To be further described below, script-generated profile detection 154 in some embodiments is based on comparisons among the identifiers in the user settings 160. For example, based on the comparisons, the processor 120 may determine that a subset of user settings 163 includes script-generated email addresses, and determine that the email addresses in the remaining subset of user settings 162 are not script-generated email addresses. The processor 120 may classify the users corresponding to user settings 163 as suspicious users, and may restrict access to the resources 112 from the suspicious users corresponding to user settings 163. Upon completing the script-generated profile detection 154, the processor 120 proceeds to perform the abnormal usage detection 156 on the user settings 162. In some examples, a user setting including a script-generated email address may indicate that a user profile within the user setting is generated by a script or computer program.

The abnormal usage detection 156 includes determining a presence of abnormal behaviors exhibited by users corresponding to the user settings 162. To be described in more detail below, the processor 120 may perform multivariate analysis on usage behavior data among the user settings 162 against a reference model. The reference model may be constructed by the processor 120 based on historical usage behaviors among user settings 129. In some examples, the processor 120 may construct a first reference model representing normal (e.g., not suspicious) usage behavior exhibited by a plurality of users that are not classified as sources of suspicious activities. In some examples, the processor 120 may construct a second reference model representing suspicious usage behavior exhibited by a plurality of users that are classified as sources of suspicious activities. The processor 120 may perform multivariate analysis on usage behavior data among the user settings 162 against the first and/or the second reference model, depending on a desired implementation of the system 100. Upon the multivariate analysis, the processor 120 may determine that usage behavior of users corresponding to a subset of user settings 165 are abnormal, and may determine that the users corresponding to the remaining subset of user settings 164 exhibit normal user behavior. The processor 120 classifies the users corresponding to the user settings 165 as sources of suspicious activities and may restrict, or block, access from the suspicious users corresponding to the user settings 165 to resources 112. Upon completing the abnormal usage detection 156, the processor 120 outputs a notification, such as to an administrator of the system 100, to indicate a list of suspicious users (e.g., users corresponding to user settings 161, 163, 165) and recommendations of a next course of action, such as performing a review of user settings associated with the suspicious users and/or notifying a security authority.

In an example embodiment, the processor 120 may execute the user validation 152, the script-generated profile detection 154, and the abnormal usage detection 156 sequentially to improve an efficiency of the system 100. In an example embodiment, the user validation 152 may involve a first amount of computation, the script-generated profile detection 154 may involve a second amount of computation greater than the first amount, and the abnormal usage detection 156 may involve a third amount of computation greater than the second amount. The user settings 129 being analyzed in the detection process 150, as shown in the example in FIG. 1, is reduced to user settings 160 upon a completion of user validation 152. Then, the user settings 160 are reduced to user settings 162 upon a completion of script-generated profile detection 154. Then, the processor 120 executes the abnormal usage detection 156 on the user settings 162, instead of user settings 129 or user settings 160. As such, the sequential execution of the operations in the detection process 150 allows the processor to perform the least amount of computations (first amount) on the largest amount of user settings (user settings 129), and perform the greatest amount of computations (third amount) on the least amount of user settings (user settings) 162. Thus, the efficiency of the system 100 may be improved by executing the operations within the detection process 150 in a sequential manner that is based on the amount of computations involved and the amount of user settings to be analyzed in each operation of the detection process 150.

In an example embodiment, the processor 120 may be configured to assign a suspicious score to each user setting 129 during the execution of the detection process 150. In an example, if a user setting G fails the user validation 152, the processor 120 assigns a highest score to the user setting G and restricts the user of the user setting G from accessing the pool 110. In another example, if the user setting G passes the user validation 152 but a username of the user setting G, based on historical data, is similar to a suspicious user, the processor 120 may assign a score of D to the user setting G. If the user setting G with a suspicious score of D passes the script-generated profile detection 154, but a domain name of an email address of the user setting G, based on historical data, is likely to include suspicious users, the processor 120 may add E to D, such that the user setting G will be analyzed under the abnormal usage detection 156 with a starting suspicious score of D+E. The detection instructions 124 may define a threshold for the suspicious score, such that when a suspicious score of the user setting G exceeds the threshold (even if the user setting G passed the user validation 152, the script-generated profile detection 154, and/or the abnormal usage detection 156), the processor 120 may restrict access to the pool 110 by a user of the user setting G. In an example, if a user of the user setting G is restricted from accessing the pool 110 due to the suspicious score D+E exceeding the threshold, the processor 120 will not perform the abnormal usage detection 156 on the user setting G to save processing power and time.

Figure 2:
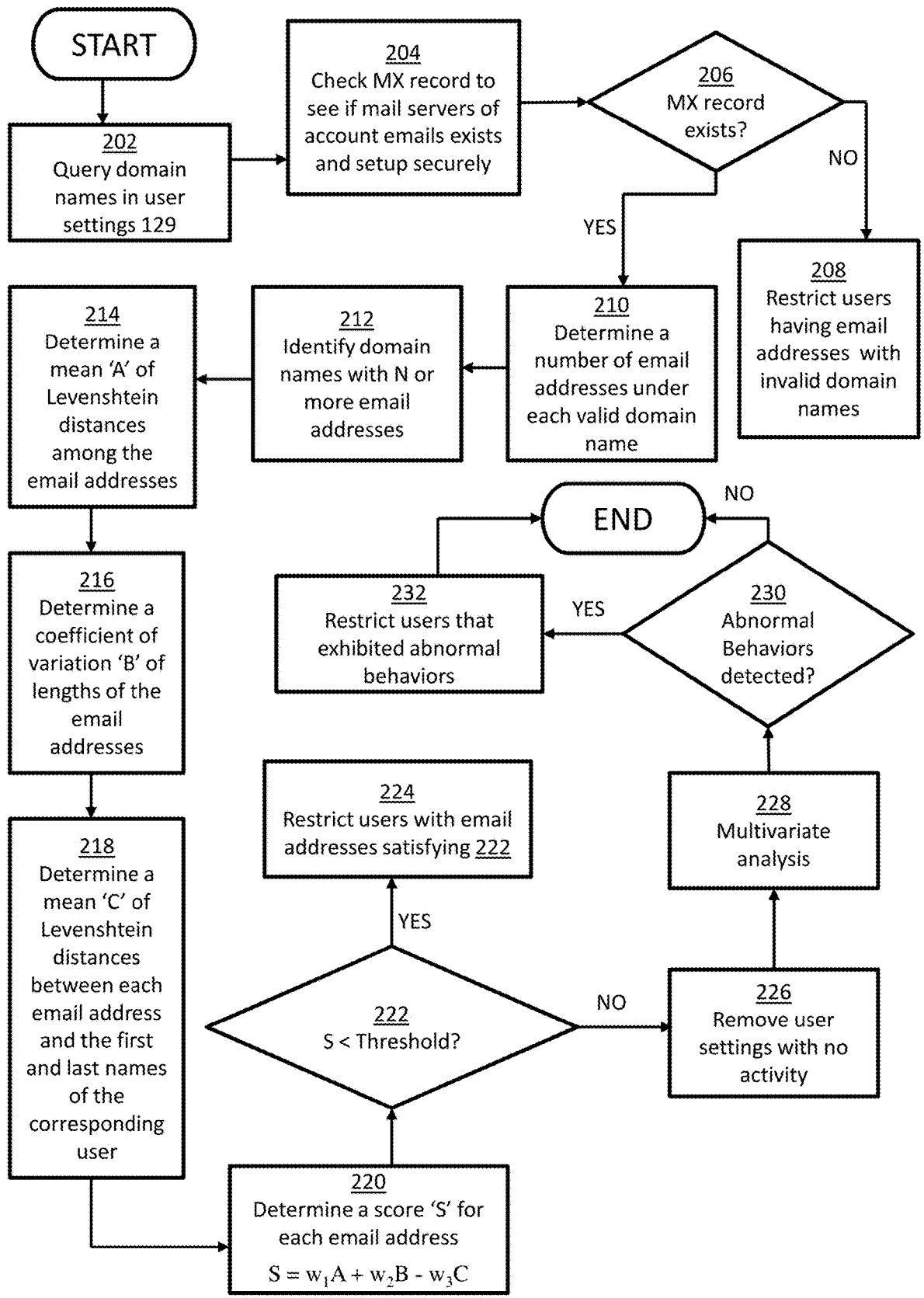
FIG. 2 illustrates a flow diagram relating to suspicious activity detection in computer networks in one embodiment.

FIG. 2 illustrates a flow diagram relating to suspicious activity detection in computer networks, arranged in accordance with at least some embodiments presented herein. FIG. 2 may be described below with references to the above descriptions of FIG. 1. The detection process shown in FIG. 2 may include one or more operations, actions, or functions as illustrated by one or more of blocks 202, 204, 206, 208, 210, 212, 214, 216, 218, 220, 222, 224, 226, 228, 230, and 232. Although illustrated as discrete blocks, various blocks may be divided into additional blocks, combined into fewer blocks, eliminated, or performed in parallel, depending on the desired implementation.

The detection process 150 starts at block 202, where the processor 120 queries one or more domain names in user settings 129. In examples where the system 100 executes the detection process 150 in response to receiving a new user profile, the processor 120 may send the domain name query 126 to the DNS 140 to request a mail exchange record of the domain name in new user profile at block 202. In another example where the processor 120 executes the detection process 150 periodically, the processor 120 may send the domain name query 126 to the DNS 140 to request mail exchange records of a plurality of domain names in the user settings 129 stored in the database 128. The DNS 140 returns mail exchange data 146 including the one or more mail exchange records that indicates a list of mail exchange servers for one or more domain names indicated by the domain name query 126.

The detection process 150 continues from block 202 to block 204, where the processor 120 analyzes the mail exchange data 146 returned from the DNS 140. For example, the processor 120 may analyze the mail exchange records in the mail exchange data 146 to determine if mail servers of a domain name X of the email address 109 exist, and whether the mail servers are and setup securely. The processor 120 may flag a set of user settings (e.g., user settings 160) as including email address with valid domain names, and flag a set of user settings (e.g., user settings 161) as including email addresses with invalid domain names.

The detection process 150 continues from block 204 to block 206, where the processor 120 analyzes the email addresses among the flagged user settings in block 204 to distinguish email addresses with valid domain names from email addresses with invalid domain names.

For email addresses with invalid domain names, the detection process 150 continues from block 206 to block 208, where the processor 120 restricts users corresponding to user settings that include email addresses with invalid domain names from accessing resources 112. For example, if the email address 109 includes an invalid domain name, the processor 120 may reject a subsequent request by the user 101 to access the resources 112.

For user settings that include email addresses with valid domain names, the detection process 150 continues from block 206 to block 210, where the processor 120 determines a number of email addresses for each valid domain name among the user settings 160. In examples where a single user setting, such as the user setting corresponding to the user 101, is being analyzed in the detection process 150, the processor 120 may determine a number of email addresses among the user settings 160 with the same domain name as the email address 109.

The detection process 150 continues from block 210 to block 212, where the processor 120 identifies domain names that have more than a certain amount of email addresses based on a threshold defined in the instructions 124. In the example shown in FIG. 2, the processor 120 may filter out, for example, remove user settings with domain names including less than N email addresses from the detection process 150. For example, the processor 120 may remove user settings including domain names that have less than three email addresses among the user settings 160. The processor 120 continues the detection process 150 with analysis on user settings with domain names including N or more (e.g., in the example of FIG. 2, three or more) email addresses among the user settings 160.

The detection process 150 continues from block 212 to block 214, where the processor 120, for each email address among the identified domain names from block 212, determine a difference between the email address and other email addresses with the same domain name. For example, if email address 109 has domain name X, the processor 120 determines a Levenshtein distance between the email address 109 and each email addresses with domain name X. Upon determining the Levenshtein distances, the processor 120 determines a mean, denoted as A, of the Levenshtein distances between the email address 109 and other email addresses with domain name X. The processors 120 determines the Levenshtein distances and means A for each email address among the user settings 160 including the identified domain names from block 212. In an example, the processor 120 may store the mean A in the memory 122, such that the processor 120 may retrieve the stored mean A from the memory 122 in order to determine a mean A' for a new email address at a subsequent execution of the detection process 150. For example, if the mean A is a mean associated with fifty email addresses of domain name X, the processor 120 may determine A' by retrieving A, multiplying A by fifty, adding the Levenshtein distance associated with the new email address, and divide the result by fifty-one—instead of computing an average of fifty-one Levenshtein distances.

The Levenshtein distance between a pair of email addresses represents a difference between the pair of email addresses. In an example, a first mean Levenshtein distance between the email address 109 and other email addresses in domain name X may be $A_1$, and a second mean Levenshtein distance between another email address K and the email addresses in domain name X may be $A_2$. If $A_1$ is greater than $A_2$, the processor 120 may determine that the email address 109 may have a smaller chance of being a script-generated email address than the email address K, since the email address K is more similar to the rest of the email addresses within domain X.

The detection process 150 may continue to block 216. The blocks 214 and 216 may be performed by the processor 120 simultaneously or in an arbitrary order. At block 216, the processor 120 determines a coefficient of variation, denoted as B, of lengths of the email addresses for each domain name identified in block 212. The coefficient of variation B represents a degree of variation of the lengths of email addresses within a domain name. If the coefficient of variation $B_1$ of a first domain name is higher than a coefficient of variation $B_2$ of a second domain name, then the second domain name may have a greater likelihood than the first domain name of having script-generated email addresses due to having less length variation among the email addresses of the second domain name. In an example, the processor 120 may store the coefficient of variation B in the memory 122, such that the processor 120 may retrieve the stored coefficient of variation B from the memory 122 in order to determine a coefficient of variation B' for a new email address at a subsequent execution of the detection process 150.

The detection process 150 may continue to block 218. The blocks 214, 216, and 218 may be performed by the processor 120 simultaneously or in an arbitrary order. At block 218, for each email address among the identified domain names from block 212, the processor 120 determines a difference between the email address with a name (first name and/or last name) of a corresponding user. For example, the processor 120 may determine a Levenshtein distance between the email address 109 and a combination of the first and last name of the user 101. The Levenshtein distance between an email address and the name of a corresponding user may be used as an indication to determine whether an email address is a script-generated email address in situations where historical data indicates that users tend to use one or more of their first and last names in an email address. Upon determining the Levenshtein distance between each email address and corresponding user name, the processor 120 may determine a mean, denoted as C, of the Levenshtein distances between email addresses and user names within each domain name. For example, the processor 120 may determine a mean $C_X$ that represents a mean of Levenshtein distances between email addresses of domain name X with associated user names. In an example, the processor 120 may store the mean $C_X$ in the memory 122, such that the processor 120 may update the stored mean $C_X$ to a mean $C_X'$ using a new email address at a subsequent execution of the detection process 150.

In an example embodiment, A, B, and C may be represented as a percentage, such as an unmatched percentage represented as 100×(Actual Difference/Maximum Difference). For example, the mean A for each email address i may be denoted as $A_i=\text{Average}[100\times(L^A_{ij}/L^A_{max})]$, where $L^A_{ij}$ denotes a Levenshtein distance between the email address i and another email address j with a same domain name, and $L^A_{max}$ denotes a maximum Levenshtein distance determined between a pair of email addresses with the same domain name. For example, if the domain name X includes three email addresses (i=1, 2, 3) the processor 120 may determine three different Levenstein distances $L^A_{12}$, $L^A_{13}$, $L^A_{23}$. The processor 120 may identify the Levenshtein distance of a largest value and assign the identified Levenshtein distance as $L^A_{max}$. Then, the processor 120, may determine $A_i$ for each email address based on the assigned $L^A_{max}$. Similarly, the coefficient of variation B may be denoted as $B=\text{Average}[100\times(L^B_{ij}/L^B_{max})]$, where $L^B_{ij}$ denotes a length difference between the email address i and another email address j with a same domain name, and $L^B_{max}$ denotes a maximum length difference determined between a pair of email addresses with the same domain name. Similarly, the mean C for each email address i may be denoted as $C_i=\text{Average}[100\times(L^C_i/L^C_{max})]$, where $L^C_i$ denotes a Levenshtein distance between the email address i and a name of the user associated with the email address i, and $L^C_{max}$ denotes a maximum Levenshtein distance determined between an email address and a name of an associated user within the same domain name. In an example, when two email addresses (i, j) are identical $L^A_{ij}$ will be zero, such that $A_i$ is 0%. In an example, as the difference between two email addresses (i, j) increases, the value $L^A_{ij}$ will increase as well. Thus, the likelihood of a user setting being associated with a source of suspicious activities increases as the unmatched percentage $A_i$ increases. Similarly, the likelihood of a user setting being associated with a source of suspicious activities increases as the unmatched percentage B increases. Further, the likelihood of a user setting being associated with a source of suspicious activities increases as the unmatched percentage $C_i$ decreases.

The detection process 150 may continue from blocks 214, 216, and/or 218 to block 220, where the processor 120 determines a score, denoted as S for each email address, and where $S=w_1A+w_2B-w_3C$. The variables $w_1$, $w_2$, and $w_3$ may denote weights for the mean A, the coefficient of variation B, and the mean C, respectively. The weights $w_1$, $w_2$, and $w_3$ may be continuously adjusted by the processor 120 upon each execution of the detection process 150. An initial value of the weights $w_1$ and $w_2$ may be defined in the instructions 124. In an example, the weights $w_1$, $w_2$, and $w_3$ may be dependent on results from historical executions of the detection process 150, a volume (e.g., number of email addresses) of each domain name being analyzed, an amount of script-generated email addresses in each domain name historically, an importance of each A, B, and C defined in the detection instructions 124, and/or other factors. For example, if the detection instructions 124 defined A as the most important component of the score S, $w_1$ may be adjusted to be larger than $w_2$ and $w_3$. In another example, if a dispersion of a distribution of C is larger than a dispersion of a distribution of A, then the weight $w_1$ may be adjusted to be larger than $w_3$ to give more importance to A. In an example, a large dispersion of the distribution of C may indicate an inconsistency of whether users use their first and/or last name in their email addresses.

The detection process 150 may continue from blocks 220 to block 222, where the processor 120 may determine whether the score S of each email address satisfies a condition defined in the instructions 124. For example, the processor 120 may determine whether the score S of the email address is less than a threshold defined in the instructions 124. In an example, the likelihood of an email address being a script-generated email address increases as the values of A and B decreases and as the value of C increases. Thus, the score S decreases with an increasing likelihood of the email address being a script-generated email address. The instruction 124 may define a threshold for the score S, where the value of the threshold is based on a desired implementation of the system 100. For example, as the value of the threshold increases, the system 100 may identify more user settings that may include script-generated email address. In some examples, the instructions 124 may define additional conditions at block 222 based on a desired implementation of the system 100. For example, aside from determining whether the score S is less than the threshold, the condition may further include determining whether the coefficient variable B is less than another threshold, such that when both conditions relating to S and B are satisfied, the user 101 may be classified by the processor 120 as suspicious.

The detection process 150 proceeds from block 222 to block 224 if the condition in block 222 is satisfied. At block 224, the processor 120 restricts users corresponding to user settings with email addresses that satisfied the conditions in block 222. For example, if the email address 109 is likely to be a scrip-generated email address, the processor 120 may reject a subsequent request by the user 101 to access the resources 112.

The detection process 150 proceeds from block 222 to block 226 if the condition in block 222 is not satisfied. At block 226, the processor 120 removes user settings including no activity, or no recent activity, from the detection process 150. For example, the resources 112 among the pool 110 may be employed to execute a mobile game. At block 226, the processor 120 may remove user settings corresponding to users who have registered but never played the mobile game, or users who have not played the mobile game within the past week, two weeks, one month, and/or other time period that may be defined by the instructions 124.

The detection process 150 may proceed from block 226 to block 228, where the processor 120 may perform multivariate analysis on user settings that are not removed in block 226. The multivariate analysis may include using robust principal component analysis to identify abnormal patterns among usage behavior exhibited by the users corresponding t user settings remaining from the block 226. In some examples, the variables of usage behavior that may be analyzed by the processor at 120 at block 228 may include differences between location information in registration information and an Internet Protocol (IP) address that provided the user profile, user engagement scores with latency, frequency, and duration measures, user engagement scores with conversations asked by accounts through a customer messaging platform of the system 100, z-scores (standard score) of usage distribution. In an example, the processor 120 may identify abnormal usage behavior by identifying scores of user settings which have excessively used the resources 112 within a short period of time. In some examples, the processor 120 may perform the multivariate analysis using other unsupervised clustering algorithms different from the robust principal component analysis. In another example, the processor 120 may identify abnormal usage behavior based on usage attributes representing engagement of users of the pool 110, such as recency, frequency, duration, and lifetime, and/or other attributes. Recency refers to an amount of time (e.g., a number of days) starting from a time of most recent activity to a current time. Frequency refers to an amount of activities by the users from a starting time (e.g., a time in which a user requested resources 112) to the current time. Duration refers to an amount of time from the starting time to a first time activity date (e.g., how long after the request did a user start using resources 112). Lifetime refers to an amount of time starting from the starting time to the ending date of the most recent activity. By analyzing these attributes, the processor 120 may identify abnormal usage behavior by analyzing users who have taken any action recently, have taken any action frequently, have taken any action soon after registration or request for resources 112, and have spent relatively more time on using the resources 112.

In some examples, the multivariate analysis may also include reference model comparisons. The processor 120 may be configured to construct a reference model using historical usage behavior. For example, the processor 120 may construct a first model indicating how often users who are not suspicious use the resources 112 within particular time periods, and a second model indicating how often historically suspicious users use the resources 112 within the same particular time periods. The processor 120 may compare the usage behavior of the user settings being analyzed at block 228 with the first and second models to determine whether each user profile exhibits abnormal behavior. In another example, the processor 120 may identify abnormal usage behaviors by determining similarity scores between the usage behavior being analyzed and historically suspicious user behaviors, and/or other variables.

The detection process 150 may proceed from block 228 to block 230, where the processor 120 may identify users that exhibit abnormal behavior based on the multivariate analysis performed at block 228.

If a user exhibits abnormal behavior, the detection process 150 may proceed from block 230 to block 232, where the processor 120 may restrict access from the user to the resources 112. For example, if usage behavior in the user setting 129 corresponding to the user 101 includes abnormal behavior, the processor 120 may reject a subsequent request by the user 101 to access the resources 112.

If a user does not exhibit abnormal behavior, the processor 120 may end and conclude the detection process 150, and permit a subsequent request by the user to access the resources 112. The processor 120 may compile a list of sources of suspicious activities, such as users that are restricted from accessing resources 112 at blocks 208, 224, 232, and may output the compiled list of sources on a display, in a user interface, and/or to another device, that may be controlled by an administrator of the system 100 to provide notification and recommendations for a next course of actions. For example, the processor may output a recommendation to review the user profiles corresponding to the compiled list, or to contact the users among the compiled list, or to contact authorities related to cybersecurity.

Figure 3:
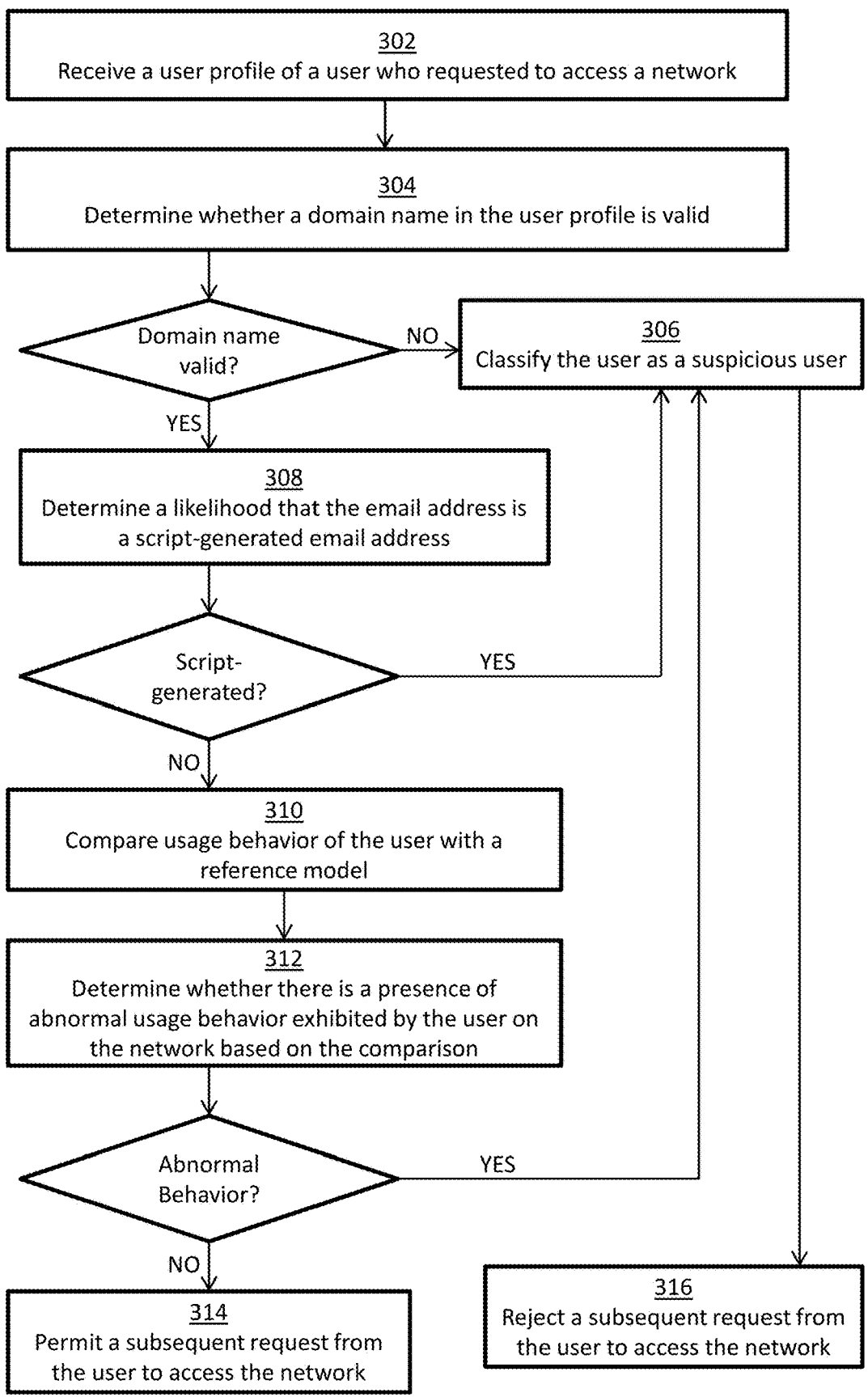
FIG. 3 illustrates a flow diagram relating to suspicious activity detection in computer networks in one embodiment.

FIG. 3 illustrates a flow diagram relating to suspicious activity detection in computer networks, arranged in accordance with at least some embodiments presented herein. The process in FIG. 3 may be implemented using, for example, computer system 100 discussed above. An example process may include one or more operations, actions, or functions as illustrated by one or more of blocks 302, 304, 306, 308, 310, 312, 314, and/or 316. Although illustrated as discrete blocks, various blocks may be divided into additional blocks, combined into fewer blocks, eliminated, or performed in parallel, depending on the desired implementation.

Processing may begin at block 302, where a processor receives a user profile of a user who requested to access a network. The user profile comprises at least an email address and usage behavior of the user, the email address comprises a domain name, and the usage behavior indicates historical usage of the network by the user.

Processing may continue from block 302 to block 304. At block 304, the processor determines whether the domain name is valid. The processor determines whether the domain name is valid by sending a query for the domain name to a domain name system, and receives a mail exchange record indicating a mapping of the domain name to a list of servers. If the mail exchange record is received at the processor from the domain name system, the processor determines that the domain name is valid. If the mail exchange record is not received at the processor from the domain name system, the processor determines that the domain name is invalid.

If the domain name is invalid, the processing may continue to block 306. At block 306, where the processor classifies the user as a suspicious user. The processing may continue from block 306 to block 316, where the processor rejects a subsequent request from the user to access the network.

If the domain name is valid, the processing may continue to block 308. At block 308, the processor determines a likelihood that the email address is a script-generated email address. The determining of the likelihood is based on a difference between the email address and a plurality of email addresses, the plurality of email addresses comprises the domain name, and the plurality of email addresses are associated with other users who have requested access to the network. In an example, the determination of the likelihood is based on a first mean, a second mean, and a coefficient of variation of lengths. The first mean is an average of differences between the email address and the plurality of email addresses. The second mean is an average of difference between the email address and a name of the user, and differences between the plurality of email addresses and names of corresponding users. The coefficient of variation of lengths is an average variation of lengths of the plurality of email addresses. The likelihood is determined by the processor based on comparison of a score with a threshold, where the score is based on the first mean, the coefficient of variation of lengths, and the second mean.

If the email address is a script-generated email address, the processing may continue to block 306, where the processor classifies the user as a suspicious user. The processing may continue from block 306 to block 316, where the processor rejects a subsequent request from the user to access the network. If the email address is not a script-generated email address, the processing may continue to block 310. At block 310, the processor compares usage behavior of the user with a reference model. The reference model is based on usage behavior exhibited by the other users who have requested access to the network. In some examples, the comparison of the usage behavior with the reference model is performed by the processor in response to detecting a presence of activities performed by the user on the network. In some examples, comparing the usage behavior with the reference model comprises comparing the usage behavior with historical usage behavior exhibited by suspicious users on the network.

Processing may continue from block 310 to block 312. At block 312, the processor determines whether there is a presence of abnormal usage behavior exhibited by the user on the network based on the comparison. In some examples, the processor determines the presence of abnormal usage behavior comprises using a robust principal component analysis.

If the processor determines a presence of abnormal usage behavior, the processing may continue to block 306, where the processor classifies the user as a suspicious user. The processing may continue from block 306 to block 316, where the processor rejects a subsequent request from the user to access the network. If the processor determines that there is no presence of abnormal usage behavior, the processing may continue to block 314. At block 314, the processor permits a subsequent request from the user to access the network.

Figure 4:
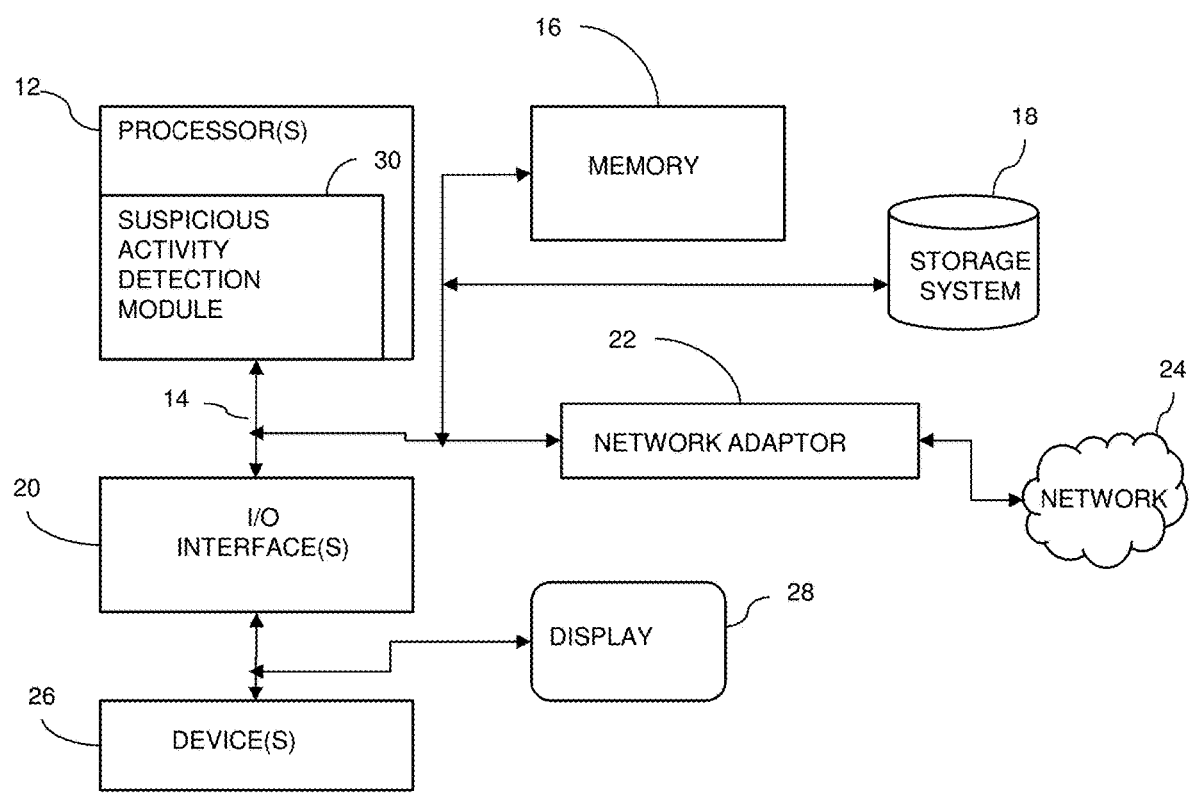
FIG. 4 illustrates a schematic of an example computer or processing system that may implement suspicious activity detection in computer networks in one embodiment.

FIG. 4 illustrates a schematic of an example computer or processing system that may implement suspicious activity detection in computer networks in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., suspicious activity detection module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 5:
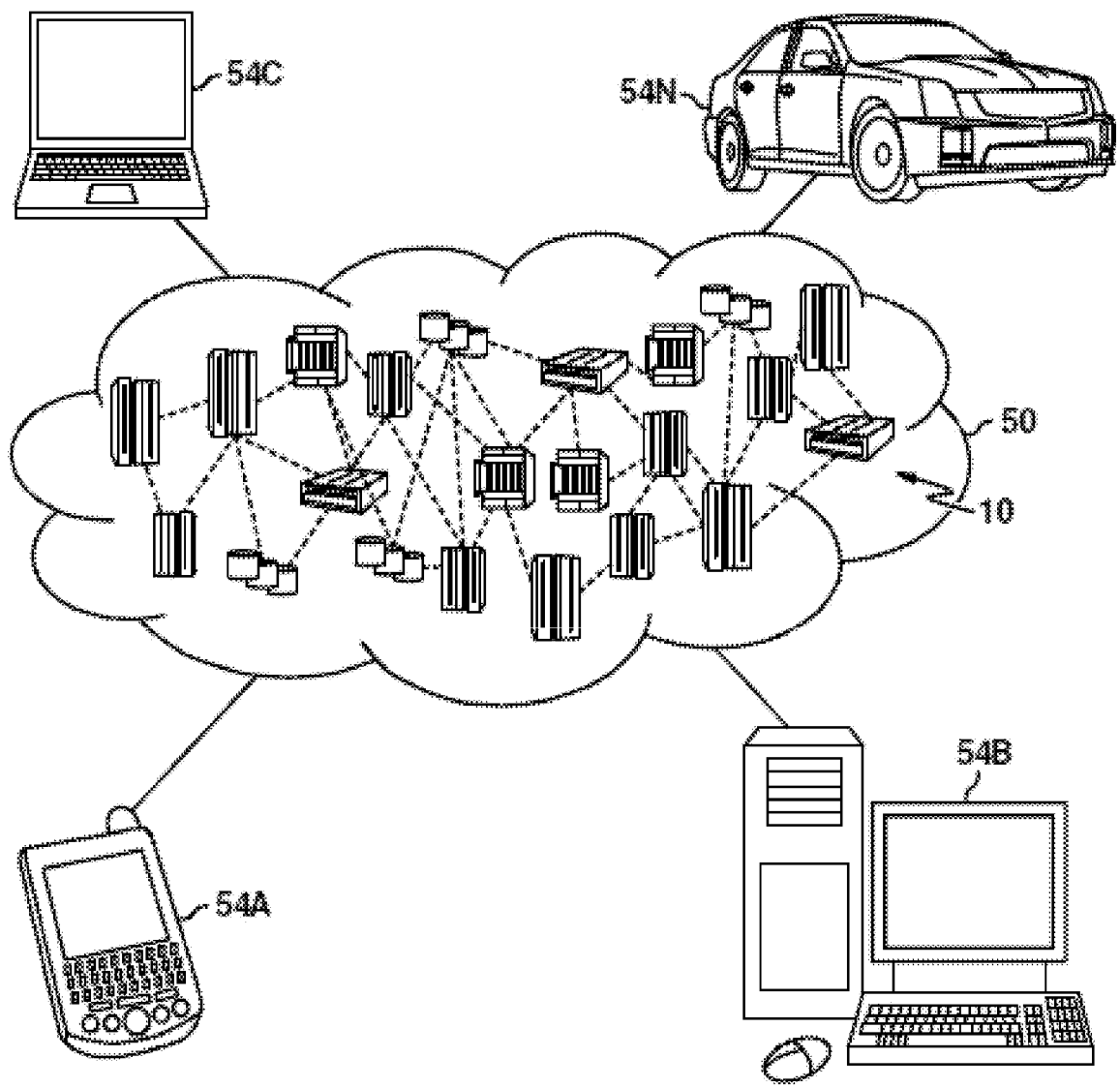
FIG. 5 depicts a cloud computing environment according to an embodiment of the present invention.

FIG. 5 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
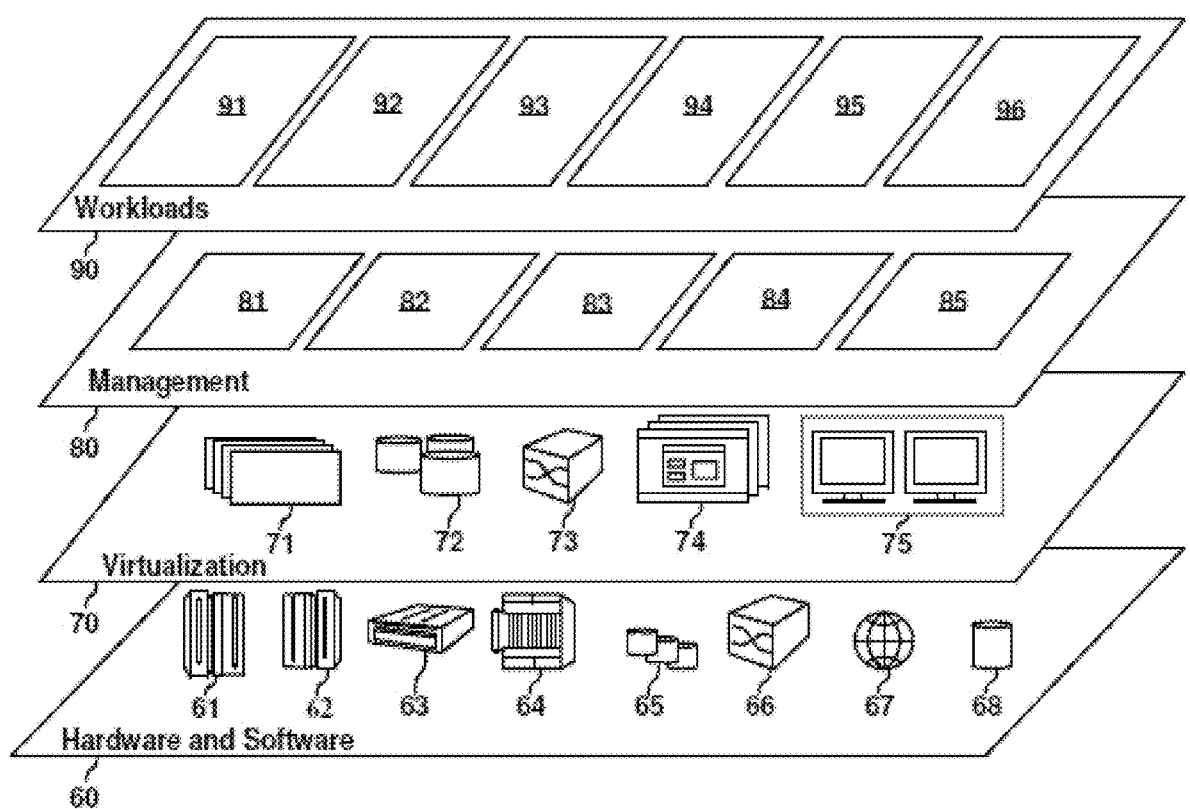
FIG. 6 depicts abstraction model layers according to an embodiment of the present invention.

FIG. 6 depicts abstraction model layers according to an embodiment of the present invention. Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and suspicious activity detection 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving, by a processor, a user profile of a user who requested to access a network, wherein the user profile comprises at least an email address of the user, the email address comprises a domain name;
   determining, by the processor, whether the domain name is valid;
   in response to determining that the domain name is invalid, classifying, by the processor, the user as a suspicious user;
   in response to determining that the domain name is valid:
      determining, by the processor, a likelihood that the email address is a script-generated email address, wherein the determining of the likelihood is based on a difference between the email address and a plurality of email addresses, the plurality of email addresses comprises the domain name, and the plurality of email addresses are associated with other users who have requested access to the network;
      in response to determining, based on the likelihood, that the email address is a script-generated email address, classifying, by the processor, the user as a suspicious user;
      in response to determining, based on the likelihood, that the email address is not a script-generated email address:
         comparing, by the processor, usage behavior of the user with a reference model, wherein the usage behavior indicates historical usage of the network by the user;
         determining, by the processor, whether there is a presence of abnormal usage behavior exhibited by the user on the network based on the comparison;

in response to determining the presence of abnormal usage behavior exhibited by the user on the network, classifying, by the processor, the user as a suspicious user; and rejecting, by the processor, a subsequent request from the user to access the network.

2. The computer-implemented method of claim 1, further comprising in response to determining that there is no presence of abnormal usage behavior exhibited by the user on the network, permitting, by the processor, the subsequent request from the user to access the network.

3. The computer-implemented method of claim 1, wherein determining whether the domain name is valid comprises:

sending, by the processor, a query for the domain name to a domain name system;

in response to receiving a mail exchange record indicating a mapping of the domain name to a list of servers, determining, by the processor, that the domain name is valid; and in response to not receiving the mail exchange record indicating the mapping of the domain name to a list of servers, determining, by the processor, that the domain name is invalid.

4. The computer-implemented method of claim 1, wherein determining the likelihood that the email address is a script-generated email address comprises:

determining, by the processor, a first mean of differences between the email address and the plurality of email addresses;

determining, by the processor, a coefficient of variation of lengths of the plurality of email addresses;

determining, by the processor, a second mean of a difference between the email address and a name of the user, and differences between the plurality of email addresses and names of corresponding users;

determining, by the processor, a score based on the first mean, the coefficient of variation of lengths, and the second mean;

comparing, by the processor, the score with a threshold;

determining, by the processor, the likelihood that the email address is a script-generated email address based on the comparison of the score with the threshold.

5. The computer-implemented method of claim 1, wherein determining whether there is a presence of abnormal usage behavior comprises using a robust principal component analysis.

6. The computer-implemented method of claim 1, further comprising:

determining, by the processor, a number of email addresses that comprises the domain name;

comparing, by the processor, the determined number of email addresses with a threshold; and wherein determining the likelihood that the email address is a script-generated email address is performed in response to determining that the number of email addresses is greater than the threshold.

7. The computer-implemented method of claim 1, wherein the comparison of the usage behavior with the reference model is performed in response to detecting a presence of activities performed by the user on the network.

8. The computer-implemented method of claim 1, wherein the reference model is based on usage behavior exhibited by the other users who have requested access to the network.

9. The computer-implemented method of claim 1, wherein comparing the usage behavior with the reference model comprises comparing, by the processor, the usage behavior with historical usage behavior exhibited by suspicious users on the network.

10. A system comprising:

a memory device configured to store a user setting of a user who requested to access a network, wherein the user setting comprises at least an email address and usage behavior of the user, the email address comprises a domain name, and the usage behavior indicates historical usage of the network by the user;

a hardware processor configured to be in communication with the memory device, the hardware processor being configured to:

determine whether the domain name is valid;

in response to a determination that the domain name is invalid, classify the user as a suspicious user;

in response to a determination that the domain name is valid:

determine a likelihood that the email address is a script-generated email address, wherein the determination of the likelihood is based on a difference between the email address and a plurality of email addresses, the plurality of email addresses comprises the domain name, and the plurality of email addresses are associated with other users who have requested access to the network;

in response to a determination, based on the likelihood, that the email address is a script-generated email address, classify the user as a suspicious user;

in response to a determination, based on the likelihood, that the email address is not a script-generated email address:

compare the usage behavior with a reference model;

determine whether there is a presence of abnormal usage behavior exhibited by the user on the network based on the comparison;

in response to the determination of the presence of abnormal usage behavior exhibited by the user on the network, classify the user as a suspicious user; and reject a subsequent request from the user to access the network.

11. The system of claim 10, wherein the hardware processor is further configured to, in response to determining that there is no presence of abnormal usage behavior exhibited by the user on the network, permit the subsequent request from the user to access the network.

12. The system of claim 10, wherein the hardware processor is further configured to:

send a query for the domain name to a domain name system;

in response to a receipt of a mail exchange record indicating a mapping of the domain name to a list of servers, determine that the domain name is valid; and in response to no receipt of the mail exchange record indicating the mapping of the domain name to a list of servers, determine that the domain name is invalid.

13. The system of claim 10, wherein the hardware processor is further configured to:

determine a first mean of differences between the email address and the plurality of email addresses;

determine a coefficient of variation of lengths of the plurality of email addresses;

determine a second mean of a difference between the email address and a name of the user, and differences between the plurality of email addresses and names of corresponding users;

determine a score based on the first mean, the coefficient of variation of lengths, and the second mean;

compare the score with a threshold;

determine the likelihood that the email address is a script-generated email address based on the comparison of the score with the threshold.

14. The system of claim 10, wherein the hardware processor is further configured to:

determine a number of email addresses that comprises the domain name;

compare the determined number of email addresses with a threshold; and wherein the determination of the likelihood that the email address is a script-generated email address is performed in response to a determination that the number of email addresses is greater than the threshold.

15. The system of claim 10, wherein the comparison of the usage behavior with the reference model comprises a comparison of the usage behavior with historical usage behavior exhibited by suspicious users on the network.

16. A computer program product of classifying suspicious users of a network, the computer program product comprising a computer readable storage medium having program instructions embodied therewith, the program instructions executable by a processing element of a device to cause the device to:

receive a user profile of a user who requested to access a network, wherein the user profile comprises at least an email address, the email address comprises a domain name;

determine whether the domain name is valid;

in response to a determination that the domain name is invalid, classify the user as a suspicious user;

in response to a determination that the domain name is valid:

determine a likelihood that the email address is a script-generated email address, wherein the determination of the likelihood is based on a difference between the email address and a plurality of email addresses, the plurality of email addresses comprises the domain name, and the plurality of email addresses are associated with other users who have requested access to the network;

in response to a determination, based on the likelihood, that the email address is a script-generated email address, classify the user as a suspicious user;

in response to a determination, based on the likelihood, that the email address is not a script-generated email address:

compare usage behavior of the user with a reference model, wherein the usage behavior indicates historical usage of the network by the user;

determine whether there is a presence of abnormal usage behavior exhibited by the user on the network based on the comparison;

in response to the determination of the presence of abnormal usage behavior exhibited by the user on the network, classify the user as a suspicious user; and reject a subsequent request from the user to access the network.

17. The computer program product of claim 16, wherein the program instructions are further executable by the processing element of the device to cause the device to, in response to determining that there is no presence of abnormal usage behavior exhibited by the user on the network, permit the subsequent request from the user to access the network.

18. The computer program product of claim 16, wherein the program instructions are further executable by the processing element of the device to cause the device to:

send a query for the domain name to a domain name system;

in response to a receipt of a mail exchange record indicating a mapping of the domain name to a list of servers, determine that the domain name is valid; and in response to no receipt of the mail exchange record indicating the mapping of the domain name to a list of servers, determine that the domain name is invalid.

19. The computer program product of claim 16, wherein the program instructions are further executable by the processing element of the device to cause the device to:

determine a first mean of differences between the email address and the plurality of email addresses;

determine a coefficient of variation of lengths of the plurality of email addresses;

determine a second mean of a difference between the email address and a name of the user, and differences between the plurality of email addresses and names of corresponding users;

determine a score based on the first mean, the coefficient of variation of lengths, and the second mean;

compare the score with a threshold;

determine the likelihood that the email address is a script-generated email address based on the comparison of the score with the threshold.

20. The computer program product of claim 16, wherein the comparison of the usage behavior with the reference model comprises a comparison of the usage behavior with historical usage behavior exhibited by suspicious users on the network.

* * * * *